United States Patent [19]
Tadewald

[11] 3,922,384
[45] Nov. 25, 1975

[54] ELECTRICALLY CONDUCTIVE FIBERS

[75] Inventor: Thomas D. Tadewald, La Crosse, Wis.

[73] Assignee: Universal Oil Products Company, Des Plaines, Ill.

[22] Filed: July 3, 1974

[21] Appl. No.: 485,669

[52] U.S. Cl. ............... 427/87; 427/126; 427/185; 427/204; 252/456
[51] Int. Cl.² .......................................... B05D 5/12
[58] Field of Search........ 117/201, 218, 226, 106 R, 117/138.8 X, 126 GB, 126 GE

[56] References Cited
UNITED STATES PATENTS

| | | | |
|---|---|---|---|
| 3,027,278 | 3/1962 | Reick | 117/226 |
| 3,039,897 | 6/1962 | Waring et al. | 117/226 |
| 3,582,445 | 6/1971 | Okbehashi | 117/226 X |

*Primary Examiner*—Mayer Weinblatt
*Attorney, Agent, or Firm*—James R. Hoatson, Jr.; Raymond H. Nelson; William H. Page, II

[57] ABSTRACT

Electrically conductive fibers which comprise synthetic or naturally occurring fibers having the surface thereof impregnated with a semi-conducting pyropolymeric inorganic refractory oxide material and which are used for heating filaments, etc., are prepared by passing the fiber through an environment containing a semi-conducting pyropolymeric inorganic refractory oxide material at a temperature in the range of from about 200° F. to about 600° F.

13 Claims, 1 Drawing Figure

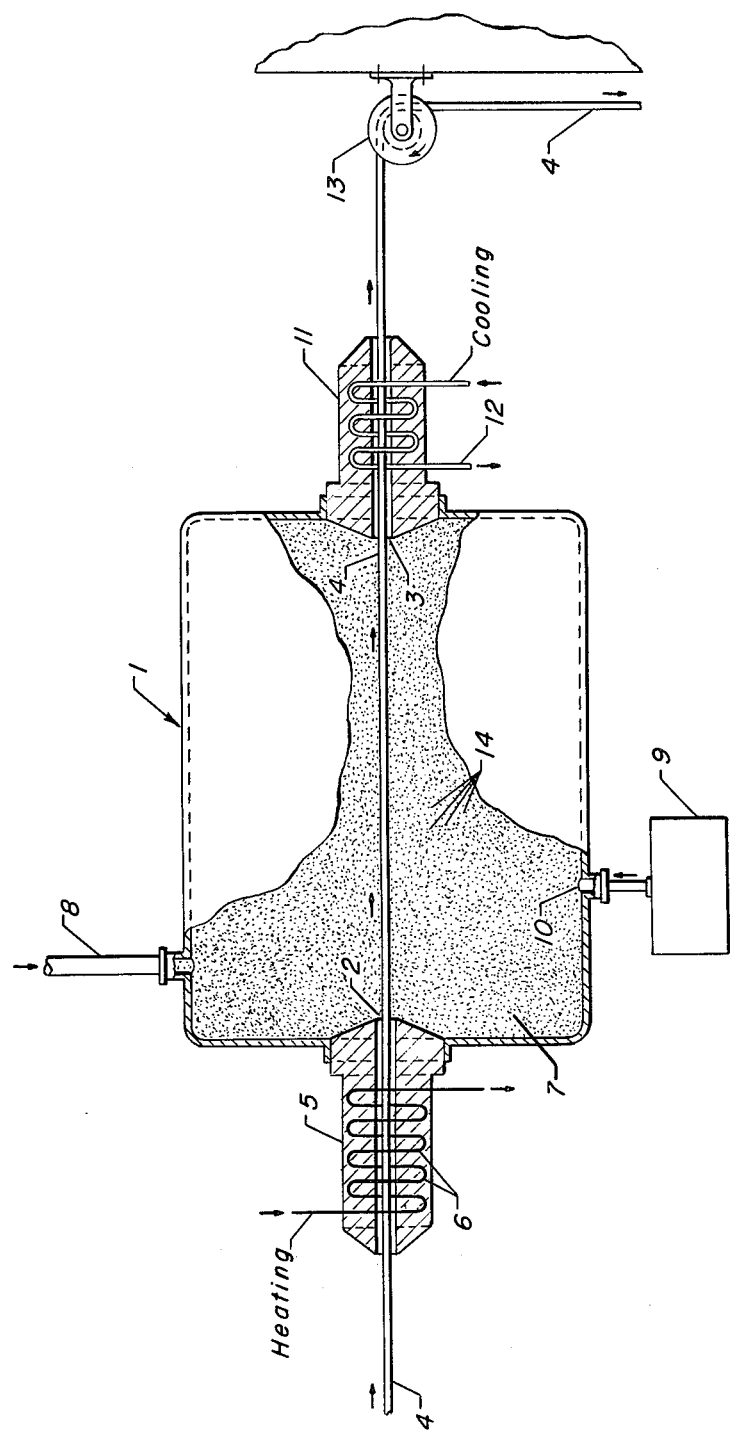

ELECTRICALLY CONDUCTIVE FIBERS

This invention relates to novel synthetic or naturally occurring fibers, the surface of which is impregnated with a semi-conducting pyropolymeric inorganic refractory oxide material. More specifically, the invention is concerned with these fibers which will maintain a conductivity and to a process for the preparation of the same.

Electrically conductive fibers either synthetic or naturally occurring in nature which contain a semi-conducting pyropolymeric inorganic refractory oxide material impregnated on the surface thereof will find a wide variety of uses where a specific conductivity is required. For example, these fibers may be used as heating filaments in electrical devices or they may be woven into other fibers such as cotton, wool, Nylon, Dacron, etc. which do not contain the surface impregnation and thus being used for garments, rugs, mats, etc., whereby any static charge which may tend to build up will be drained off prior to creating an electrical discharge thereof. Thus it can be seen that the use of these impregnated materials will be useful where the danger of an electrical spark will create an unnecessary danger or peril such as in an operating room or other areas where flammable gases or liquids may be present.

It is therefore an object of this invention to provide a novel electrically conductive fiber which possesses a conductivity within a specific range.

Another object of this invention is to provide a process for preparing electrically conductive fibers by impregnating, on the surface of a fiber, a semi-conducting pyropolymeric inorganic refractory oxide material.

In one aspect an embodiment of this invention resides in a synthetic or naturally occurring fiber containing a semi-conducting pyropolymeric inorganic refractory oxide material impregnated on the surface thereof.

Another embodiment is found in a method for the preparation of a synthetic or naturally occurring fiber containing a semi-conducting pyropolymeric inorganic refractory oxide material impregnated on the surface thereof which comprises heating said fiber to about a glass transition temperature, passing said heated fiber through an impregnation zone provided with an environment containing said semi-conducting pyropolymeric inorganic refractory oxide material whereby said material is impregnated on the surface of said fiber, cooling and recovering said fiber.

A specific embodiment of this invention is found in a thermoplastic resin fiber such as a polyester fiber containing a semi-conducting pyropolymeric inorganic refractory oxide material which possesses a resistivity in the range of from about $10^8$ to about $10^{-2}$ ohm-centimeters impregnated on the surface of said polyester.

Another specific embodiment of this invention is found in a method for the preparation of a synthetic or naturally occurring fiber containing a semi-conducting pyropolymeric inorganic refractory oxide material impregnated on the surface thereof which comprises heating said fiber to a temperature in the range of from about 200° to about 600° F., passing said heated fiber through an impregnation zone provided with an environment containing said semi-conducting pyropolymeric inorganic refractory oxide material which is maintained in a state of agitation whereby said material is impregnated on the surface of said fiber, cooling and recovering said fiber.

Other objects and embodiments will be found in the following further detailed description of the present invention.

As hereinbefore set forth the present invention is concerned with electrically conductive fibers comprising synthetic or naturally occurring fibers, the surface of which is impregnated with a semi-conducting pyropolymeric inorganic refractory oxide material and to a method for the preparation thereof. The fibers which are impregnated with a semi-conducting pyropolymeric inorganic refractory oxide material of the type hereinafter set forth in greater detail may include naturally occurring fibers such as cotton, wool, linen, asbestos, or synthetic fibers, both thermoplastic and thermosetting in nature. Some examples of thermoplastic fibers which may be impregnated with the semi-conducting pyropolymeric inorganic refractory oxide material will include polyethylene, polypropylene, polyvinyl, polyvinyl chloride, polystyrene, polyesters, polyamides, polyimides, acrylonitrile-butadiene-styrene formulations (ABS), polyurethane, polycarbonates, phenylene oxides, polyacrylates, the various Nylons such as Nylon 6, Nylon 6/6, Nylon 6/10, Nylon 11, Nylon 12, Nylon 99, etc., Minlon, etc. Some examples of thermosetting synthetic fibers will include fibers coated with epoxy resins, melamine resins, phenolic resins, etc. In the preferred embodiment of the present invention these latter fibers may be coated with a thermosetting resin prior to being impregnated with the material.

The semi-conducting pyropolymeric inorganic refractory oxide material which is impregnated on the surface of a fiber of the type hereinbefore set forth may comprise a mono-layer of a carbonaceous pyropolymer, consisting of carbon and hydrogen, formed on the surface of a high surface area inorganic refractory oxide support, said material having a conductivity at room temperature in the range of from $10^{-8}$ to $10^{+2}$ inverse ohm-centimeters. The semiconducting pyropolymeric inorganic refractory oxide material may be prepared by heating an organic compound in the absence of oxygen and passing the pyrolyzable substance over the refractory oxide material in the vapor phase to deposit a carbonaceous pyropolymer thereon. The refractory oxide material which may be used as the base may be in any form such as loose or compacted dry powders, cast or calcined sols, heated sols, substrates in the form of flats, cylinders and spheres, rods, pellets, etc. In the preferred embodiment of the present invention the refractory oxide base will be characterized as having a surface area of from 1 to about 500 square meters per gram. Illustrative examples of the refractory oxides which may be used will include alumina in various forms such as gamma-alumina and silica-alumina. In addition, it is also contemplated that the refractory oxide may be preimpregnated with a catalytic metallic substance such as platinum, platinum and rhenium, platinum and germanium, platinum and tin, platinum and lead, nickel and rhenium, tin, lead, germanium, etc.

Examples of organic substances which may be pyrolyzed to form the pyropolymer on the surface of the aforementioned refractory oxides will include aliphatic hydrocarbons, cycloaliphatic hydrocarbons, aromatic hydrocarbons, aliphatic halogen derivatives, aliphatic oxygen derivatives, aliphatic sulfur derivatives, aliphatic nitrogen derivatives, heterocyclic compounds, organometallic compounds, etc. Some specific examples of these organic compounds which may be pyrolyzed will include ethane, propane, butane, pentane, ethylene, propylene, 1-butene, 2-butene, 1-pentene, 2-pentene, 1,3-butadiene, isoprene, cyclopentane, cyclohexane, methylcyclopentane, benzene, toluene, the isomeric xylenes, naphthalene, anthracene, chloromethane, bromomethane, chloroethane, bromoethane, chloropropane, bromopropane, iodopropane, chlorobutane, bromobutane, iodobutane, carbon tetrachloride, chloroform, 1,2-dichloroethane, 1,2-dichloropropane, 1,2-dichlorobutane, ethyl alcohol, n-propyl alcohol, isopropyl alcohol, n-butyl alcohol, sec-butyl alcohol, t-butyl alcohol, glycol, glycerol, ethyl ether, isopropyl ether, butyl ether, ethyl mercaptan, n-propyl mercaptan, butyl mercaptan, methyl sulfide, ethyl sulfide, ethyl methyl sulfide, methyl propyl sulfide, dimethyl amine, diethyl amine, ethyl methyl amine, acetamide, propionamide, nitroethane, 1-nitropropane, 1-nitrobutane, acetonitrile, propionitrile, formic acid, acetic acid, oxalic acid, acrylic acid, formaldehyde, acetaldehyde, propionaldehyde, acetone, methyl ethyl ketone, methyl propyl ketone, ethyl propyl ketone, methyl formate, ethyl formate, ethyl acetate, benzyl chloride, phenol, o-cresol, benzyl alcohol, hydroquinone, resorcinol, catechol, anisole, phenetole, benzaldehyde, acetophenone, benzophenone, benzoquinone, benzoic acid, phenyl acetate acid, hydrocynnamic acid, furan, furfural, pyran, coumarin, indole, dextrose, sucrose, starch, etc. It is to be understood that the aforementioned compounds are only representative of the class of compounds which may undergo pyropolymerization and that the present invention is not necessarily limited thereto.

As hereinbefore set forth one method of preparing the semiconducting pyropolymeric inorganic refractory oxide material is to admix the aforementioned organic compounds with a carrier gas such as nitrogen or hydrogen, heated and passed over the refractory oxide base. The deposition of the pyropolymer on the surface of the base is effected at relatively high temperatures ranging from about 400° to about 800° C. and preferably in a range of from about 600° to about 750° C. It is possible to govern the electrical properties of the semiconducting pyropolymeric inorganic refractory oxide material by regulating the temperature and the residence time during which the refractory oxide base is subjected to the treatment with the organic pyrolyzable substance. The thus prepared semi-conducting pyropolymeric inorganic refractory oxide material when recovered will possess a resistivity in the range of from about $10^8$ to about $10^{-2}$ ohm-centimeters. However, if so desired, the semi-conducting pyropolymeric inorganic refractory oxide material may also be subjected to additional exposure to elevated temperatures ranging from about 500° to about 1200° C. in an inert atmosophere and in the absence of additional pyrolyzable materials for various periods of time, said treatment resulting in the reduction of the electrical resistivity of the lowest resistivity powders by as much as 6 orders of magnitude. While the above material describes one method of preparing the semi-conducting pyropolymeric inorganic refractory oxide material, it is to be understood that we do not wish to be limited to this method of preparing said material and that another method may be employed in which the refractory oxide material of the type hereinbefore set forth in greater detail is impregnated with an aqueous solution of a carbohydrate material such as dextrose, sucrose, starch, etc., the impregnated inorganic refractory oxide material is thereafter dried and then pyrolyzed at a temperature ranging from about 700° to about 1200° C. whereby the carbohydrate material is pyrolyzed to form a mono-layer of the carbonaceous material on the surface of the refractory inorganic oxide material. As in the method hereinbefore set forth, the resulting semi-conducting pyropolymeric inorganic refractory oxide material may then be subjected to a second heating step at temperatures within the range hereinbefore set forth whereby the resistivity of the material may be altered to reach a predetermined level, said resistivity being in a range of from about $10^8$ to about $10^{-2}$ ohm-centimeters.

The thus prepared semi-conducting pyropolymeric inorganic refractory oxide material is then subjected to means for obtaining the desired particle size. Generally speaking, the semi-conducting pyropolymeric inorganic refractory oxide material should possess a particle size of less than 20 microns and preferably particles of a size of less than 10 microns are desirable, the optimum size being less than 1 micron. The desired electrically conductive fibers are prepared by passing the fibers to be coated through an environment containing a controlled amount of the semi-conducting pyropolymeric inorganic refractory oxide material per cubic centimeter of air whereby a controlled amount of material can be deposited or impregnated on the surface of the fiber. The impregnation is preferably effected at elevated temperatures, preferably the glass transition temperature of the fiber, said temperatures being in a range of from about 200° to about 600° F.

As an illustration of one method of preparing the desired eletrically conductive fiber of the present invention, attention is now directed to FIG. 1. It is to be understood that the method herein presented is only by way of an illustration and that other methods may also be utilized to effect the impregnation of the semi-conducting pyropolymeric inorganic refractory oxide material on the surface of the fiber. In FIG. 1, a container 1 is provided with entrance orifice 2 and exit orifice 3 respectively. Fiber 4 of the type hereinbefore set forth in greater detail is passed into container 1 after passage through a heating chamber 5. The fiber by passage through heating means 5 may be heated to the desired temperature, that is, the glass transition temperature of the fiber, by any means known in the art, one such example being heating coils 6, although it is also contemplated within the scope of this invention that the desired temperatures may be provided for by other means such as gas, etc. Fiber 4 passes through chamber 7 in container 1 at a predetermined rate of speed and therein is contacted with a controlled amount of particles of the semi-conducting pyropolymeric inorganic refractory oxide material 14 which are charged to chamber 7 through a charging means 8, said semi-conducting pyropolymeric inorganic refractory oxide material being present in such a quantity so that the material is impregnated on the surface of the fiber in an amount in the range of from about 35 to about 60% by weight of the finished fiber. In order to insure an even impregnation on the fiber, the particles of the semi-conducting pyropolymeric inorganic refractory oxide material 14 are maintained in chamber 7 in a constant state of agitation. This state of agitation may be effected by utilizing agitation means 9, one such form of agitation means being a stream of air which is passed through vent 10 at a rate sufficient to maintain the aforesaid semi-conducting pyropolymeric inorganic refractory oxide material in a sufficient state of agitation so that a uniform impregnation of the fiber is obtained. Alternatively speaking, the agition means may comprise a vibrator, although other means may also be used. After passage through chamber 7 and after having semi-conducting pyropolymeric inorganic refractory oxide material impregnated on the surface of the fiber, said fiber is withdrawn from chamber 7 through exit orifice 3 and is passed through a cooling chamber 11 where the fiber is cooled to approximately room temperature by the use of cooling means, said means which may be employed consisting of heat transfer systems such as a water line 12 or air. After impregnation and passage through the cooling means, the fiber is recovered by passage over spool 13 to storage means not shown in the drawing.

The following examples are given to illustrate the novel electrically conductive fibers of the present invention and the method which is used for the preparation thereof. However, these examples are given merely for purposes of illustration and are not intended to limit the generally broad scope of the present invention in strict accordance therewith.

EXAMPLE I

In this example a semi-conducting pyropolymeric inorganic refractory oxide material is prepared by placing gamma-alumina in a reaction vessel and heating the temperature of the vessel to about 600° C. A stream of hydrogen is passed through the vessel for a period of 2 hours and thereafter the gas is then charged to a mixture of nitrogen and cyclohexane. The mixture is passed over the alumina for a period of 20 hours, at the end of which time air passage and heating are discontinued and the resultant semi-conducting pyropolymeric inorganic refractory oxide material is recovered.

After grinding said material to a particle size of about 1 micron, a quantity of the semi-conducting pyropolymeric inorganic refractory oxide material which is prepared according to the above paragraph is charged to a vat, and a fiber comprising polyglass coated with an epoxy resin is passed into the vat. Prior to passage into the vat the fiber is heated to a temperature of approximately 150° C. by means of a heating coil and is passed through the vat while being subjected to impregnation on the surface thereof by the semi-conducting pyropolymeric inorganic refractory oxide material, said material being maintained in a state of agitation by a stream of air. The amount of the semi-conducting pyropolymeric inorganic refractory oxide material in the vat plus the rate of passage of the fiber through the vat is such so that the material which is impregnated on the surface of the fiber will comprise about 35% by weight of the finished fiber. The fiber, after withdrawal from the reaction vat, is cooled by passage through a cooling chamber and recovered.

EXAMPLE II

In a manner similar to that set forth in Example I above, a semiconducting pyropolymeric inorganic refractory oxide material is prepared by placing gamma-alumina which has been ground to a particle size of 1 micron in a reaction vessel, passing hydrogen through said vessel for a period of 2 hours while maintaining the temperature of the vessel at 700° C. and thereafter subjecting the reduced gamma-alumina to the action of a carrier gas comprising a mixture of benzene and nitrogen. The passage of the benzene and nitrogen over the alumina is effected for a period of 20 hours, after which heating is discontinued and the semi-conducting pyropolymeric inorganic refractory oxide material is recovered.

The semi-conducting pyropolymeric inorganic refractory oxide material which is prepared according to the above paragraph is charged to a reaction vat and maintained in a state of agitation by means of a stream of air. A synthetic fiber comprising a polyglass coated with a phenolic resin is passed through the vat after being heated to a temperature of approximately 120° C. by means of heating coils prior to entry into said vat. After passage through said vat the semi-conducting pyropolymeric inorganic refractory oxide impregnated fiber is continuously withdrawn, cooled by means of water pipes passing through a cooling zone and recovered.

EXAMPLE III

In this example a semi-conducting pyropolymeric inorganic refractory oxide material is prepared by impregnating gamma-alumina which has been ground to a size of 1 micron with a dextrose solution. After drying the impregnated alumina it is then pyrolyzed at a temperature of 900° C. for a period of 6 hours while maintaining the pyrolysis in a nitrogen atmosphere. The thus prepared semi-conducting pyropolymeric inorganic refractory oxide material is utilized in a manner similar to that set forth in the above examples to coat a polyester fiber in a reaction zone after the fiber has been preheated to a temperature of approximately 50° C. prior to entry into said zone. The thus coated fiber after being cooled by passage through a cooling zone is recovered.

EXAMPLE IV

A semi-conducting pyropolymeric inorganic refractory oxide material which is prepared according to Example I above is charged through an impregnation zone and maintained in a state of agitation by means of a vibrator. A polyimide fiber which has been heated to a temperature of approximately 200° C. by passage through a heating zone is passed through said impregnation zone at a sufficient speed so that the amount of semi-conducting pyropolymeric inorganic refractory oxide material which is impregnated on the surface thereof will amount to about 50% by weight of the finished fiber. After passage through said zone, the impregnated fiber is cooled and recovered.

EXAMPLE V

In this example a semi-conducting pyropolymeric inorganic refractory oxide material is prepared according to the method set forth in Example III above. The resultant material is then utilized to impregnate a Nylon 6 fiber which has been preheated to a temperature of approximately 200° C. by passage through a heating zone and thence into an impregnation zone where it is contacted with the semi-conducting pyropolymeric inorganic refractory oxide material, said material being maintained in a continuous state of agitation by means of a stream of air. The impregnated Nylon 6 fiber which contains about 40% by weight of the semi-conducting pyropolymeric inorganic refractory oxide material is continuously withdrawn from the impregnation zone, cooled and recovered.

I claim as my invention:

1. A method for the preparation of a synthetic or naturally occurring fiber containing a semi-conducting pyropolymeric inorganic refractory oxide material impregnated on the surface thereof which comprises heating said fiber to about a glass transition temperature, passing said heated fiber through an environment of said semi-conducting pyropolymeric inorganic refractory oxide material and impregnating said material on the surface of said fiber, in an amount of from about 35% to about 60% by weight of the finished fiber, cooling and recovering said fiber.

2. The method as set forth in claim 1 in which said semi-conducting pyropolymeric inorganic refractory oxide material possesses a resistivity in the range of from about $10^8$ to about $10^{-2}$ ohm-centimeters.

3. The method of claim 1, said fiber being a thermosetting resin fiber.

4. The method of claim 1, said fiber being a thermoplastic resin fiber.

5. The method of claim 1 in which said glass transition temperature is a temperature in the range of from about 200° F. to about 600° F.

6. The method of claim 1 in which said semi-conducting pyropolymeric inorganic refractory oxide material is maintained in a state of agitation.

7. The method of claim 3, said fiber being a polyglass fiber coated with an epoxy resin.

8. The method of claim 3, said fiber being a polyglass fiber coated with a phenolic resin.

9. The method of claim 4, said fiber being a polyester fiber.

10. The method of claim 4, said fiber being a polyimide fiber.

11. The method of claim 4, said fiber being Nylon 6.

12. The method of claim 6 in which said semi-conducting pyropolymeric inorganic refractory oxide material is maintained in a state of agitation by vibratory means.

13. The method of claim 6 in which said semi-conducting pyropolymeric inorganic refractory oxide material is maintained in a state of agitation by means of aeration.

* * * * *